US007885882B1

(12) United States Patent
Brander et al.

(10) Patent No.: US 7,885,882 B1
(45) Date of Patent: Feb. 8, 2011

(54) ENHANCED MATCHING APPARATUS AND METHOD FOR POST-TRADE PROCESSING AND SETTLEMENT OF SECURITIES TRANSACTIONS

(75) Inventors: Neil Frederick Brander, New York, NY (US); Andrew John Zelenka, Syosset, NY (US)

(73) Assignee: Omgeo LLC, New York, NY (US)

( * ) Notice: Subject to any disclaimer, the term of this patent is extended or adjusted under 35 U.S.C. 154(b) by 1826 days.

(21) Appl. No.: 08/976,159

(22) Filed: Nov. 21, 1997

(51) Int. Cl.
*G06F 17/60* (2006.01)
(52) U.S. Cl. ...................................... 705/36
(58) Field of Classification Search ............... 705/35, 705/36, 37, 39; 340/825.26, 825.27
See application file for complete search history.

(56) References Cited

U.S. PATENT DOCUMENTS

| | | | | |
|---|---|---|---|---|
| 4,597,046 A | | 6/1986 | Musmanno et al. ........... | 705/36 |
| 4,674,044 A | * | 6/1987 | Kalmus et al. ................ | 705/37 |
| 4,694,397 A | | 9/1987 | Grant et al. ................... | 705/42 |
| 4,823,265 A | | 4/1989 | Nelson ......................... | 705/35 |
| 4,868,866 A | | 9/1989 | Williams, Jr. ........ | 340/825.31 |
| 4,980,826 A | | 12/1990 | Wagner ....................... | 705/37 |
| 5,038,284 A | * | 8/1991 | Kramer ....................... | 705/37 |
| 5,136,501 A | * | 8/1992 | Silverman et al. ............ | 705/37 |
| 5,258,908 A | * | 11/1993 | Hartheimer et al. .......... | 705/37 |
| 5,262,942 A | | 11/1993 | Earle ........................... | 705/37 |
| 5,265,007 A | | 11/1993 | Barnhard, Jr. et al. ........ | 705/45 |
| 5,285,383 A | | 2/1994 | Lindsey et al. ............... | 705/26 |
| 5,448,043 A | | 9/1995 | Nakano et al. .............. | 235/379 |
| 5,465,206 A | | 11/1995 | Hilt et al. ..................... | 705/40 |
| 5,497,317 A | | 3/1996 | Hawkins et al. .............. | 705/37 |
| 5,563,783 A | * | 10/1996 | Stolfo et al. ................. | 705/37 |
| 5,655,088 A | * | 8/1997 | Midorikawa et al. ......... | 705/37 |
| 5,664,115 A | * | 9/1997 | Fraser ......................... | 705/37 |
| 5,689,650 A | * | 11/1997 | McCleveland ............... | 705/36 |
| 5,689,652 A | * | 11/1997 | Lupien et al. ................ | 705/37 |
| 5,717,989 A | * | 2/1998 | Tozzoli et al. ................ | 705/37 |
| 5,727,165 A | * | 3/1998 | Ordish et al. ................ | 705/37 |
| 5,761,661 A | * | 6/1998 | Cousseus et al. ............. | 707/9 |

(Continued)

OTHER PUBLICATIONS

William; "Trading stock around the clock: the future growth of global electronic markets"; California Management Review, v34, n1, p87(16); Dialog, File: 148, Accession No. 05589071, Sep. 1991.*

(Continued)

*Primary Examiner*—Romain Jeanty
(74) *Attorney, Agent, or Firm*—Schiff Hardin LLP (57) ABSTRACT

A computer-based apparatus and method for the storing, matching and communicating of post-trade settlement information for securities trades among institutional investors, broker-dealers, agents and interested parties using an enhanced matching process. With the present invention the traditional sequence of communications for trade settlement involving notices of order execution, institution allocation instructions, confirmations and affirmations is replaced by a system which matches the notice of order execution and the institution allocation instruction across designated fields within these records. Upon generating a match between a notice of order execution (or the last of a series of notices of order execution) and an institution allocation instruction, the system and method of the present invention uses in an exemplary embodiment standing instructions, disclosures, calculations, default procedures and trade information from the settlement parties to generate either a matched affirmed confirmation or a matched confirmation to effect trade settlement.

2 Claims, 6 Drawing Sheets

U.S. PATENT DOCUMENTS

| | | | | |
|---|---|---|---|---|
| 5,787,402 A | * | 7/1998 | Potter et al. | 705/37 |
| 5,794,219 A | * | 8/1998 | Brown | 705/37 |
| 5,809,483 A | * | 9/1998 | Broka et al. | 705/37 |
| 5,845,266 A | * | 12/1998 | Lupien et al. | 705/37 |
| 5,924,083 A | * | 7/1999 | Silverman et al. | 705/37 |
| 5,926,801 A | * | 7/1999 | Matsubara et al. | 705/37 |
| 5,950,176 A | * | 9/1999 | Keiser et al. | 705/37 |
| 5,950,177 A | * | 9/1999 | Lupien et al. | 705/37 |
| 6,098,051 A | * | 8/2000 | Lupien et al. | 705/37 |

OTHER PUBLICATIONS

Securities and Exchange Commission Proposed Rule Change, Depository Trust Company, filed with SEC on form 19b-4 in file SR-DTC-93-07, pp. 1-72. With exhibits: Exhibit 1: "Securities and Exchange Commission Proposed Rule Change by the Depository Trust Corporation", attached at pp. 9-16 of 72 pages; Exhibit 2: "Depository Trust Company Memorandum: An Interactive Option for the Institutional Delivery System," Mar. 31, 1993, attached at pp. 17-22 of 72 pages, and "Institutional Delivery (ID) System Functional Design Paper for Enhanced, Interactive Capabilities," Mar. 31, 1993, attached at pp. 23-67 of 72 pages; and Exhibit 3: "Depository Trust Company Memorandum: An Interactive Option for the Institutional Delivery System," Jan. 9, 1992, attached at pp. 68-72 of 72 pages.

"Institutional Delivery System—User Manual—Section M," The Depository Trust Company, 1994, pp. I-V and I-95.

"Will Anyone Miss Chicago Match," Wall Street & Technology, Apr. 1996, vol. 14, No. 4, 3 pages.

"Cross-Border Electronic Trade Confirmation Proposal," International Depository & Clearing LLC, Nov. 1996, pp. 1-28.

"A New Processing Model for Cross-Border Transactions," International Depository & Clearing LLC, Sep. 1997, 32 pages.

* cited by examiner

ENHANCED MATCHING APPARATUS AND METHOD FOR POST-TRADE PROCESSING AND SETTLEMENT OF SECURITIES TRANSACTIONS

FIELD OF THE INVENTION

The present invention relates to a system for the settlement of securities trades, and more particularly, to an apparatus and method for receiving, storing, matching and communicating post-trade securities settlement information to facilitate trade settlement.

BACKGROUND OF THE INVENTION

The settlement of securities trades—i.e., trades involving stocks, bonds and other forms of equity and debt—is a process that involves different participants such as institutional investors, broker-dealers, agents, and interested parties. An institutional investor ("institution") places a trade order with a broker-dealer to make a securities trade on behalf of itself or one of its customers. An institution is generally an investment manager, mutual fund, investment department of an insurance company, or trust department of a bank that has been granted discretionary trading authority by the institution's customer (e.g. a pension plan, corporation or endowment fund). A broker-dealer ("broker") executes buy and sell orders for the institution and receives or delivers securities and funds to settle the trade. In certain instances, a clearing broker can act as an agent for the broker in the settlement process and be responsible for receiving or delivering securities and funds on the broker's behalf. An agent ("agent") acts as an agent for the institution in the settlement process and is responsible for receiving or delivering securities and funds on behalf of the institution or its customer. In many instances, a clearing agent (generally, a custodian bank) acts for the agent in the settlement process and is responsible for receiving or delivering securities and funds on behalf of the agent. For securities settling outside of the "home market", the clearing agent is often referred to as a "global custodian." In some cases, agents and clearing agents act through other agents or custodians in order to settle a trade. An agent or custodian that acts for a clearing agent is considered to be a "subcustodian." An interested party ("interested party") is any entity designated by the institution as interested in the transaction, such as a correspondent bank or plan sponsor. Each participant in the settlement process (other than an interested party) must, among other things, communicate information about the trade to and from the other participants and arrange for the transfer of funds and securities to settle the trade.

The explosive growth of the global securities markets places additional pressure on the settlement participants to ensure that trade settlements proceed with speed and accuracy. Today, trading of securities has reached unprecedented volumes. The increasing volume and speed with which securities are traded has necessitated that governing bodies place standards on financial institutions and other parties to settle trade accounts within mandated time periods. Over the years the mandated time periods for trade settlements have been shortened. In 1995, the Securities and Exchange Commission ("SEC") mandated that securities trades must be settled within three business days of the trade date, a limit known as "T+3". Previously, trades had to be settled within five business days of the trade, or "T+5". At some point in the future this trading period may well decrease to one business day settlement, "T+1," or even same day settlement, "T+0". There is a need for systems that can facilitate rapid trade settlement communication with great accuracy in such shortened time periods.

Currently, trade settlement involves a set of communications by which the parties to the trade send and receive a series of messages that lead to settlement. Institutions typically trade in large block amounts. The securities from a block trade are then allocated to different customer accounts by an institution, with each account often involving different agents and interested parties. Institutions can also place a single trade order for an individual customer.

When a trade is executed by a broker (on a trade order placed by an institution, either for a block or single trade order), current practice directs the broker to report to the institution by way of a communication, such as a trade confirmation (which brokers use for single trades to permit the trade to be immediately affirmed) or a notice of order execution ("NOE") (which brokers use to report the execution of the trades which cannot be yet confirmed). If the trade is a block trade to be allocated among different customer accounts, for example, the trade cannot be confirmed until the broker receives information to allocate the trade among the various customer accounts. Brokers may have to execute multiple trades to fill one order, resulting in multiple NOE's being sent to the institution for a particular trade order. For trade orders covered by multiple NOE's, the broker reports cumulative information about the trade order (such as the average price per share) and information about the individual trade executed within the same NOE.

Upon the receipt of an NOE that completes an order, the institution returns a communication which conveys to the broker all trade allocations needed to complete the settlement process. If the broker agrees with the allocation information, the broker then issues a trade confirmation. To issue a trade confirmation to the institution, the broker includes information which is needed to generate a legal confirmation (as required for example by SEC Rule 10b-10 under the Securities and Exchange Act of 1934). This confirmation is typically communicated to the institution, the institution's agent and a number of interested parties, such as the underlying customer or an entity providing performance measurement for the underlying customer.

Upon receiving the broker trade confirmation, the institution continues the settlement process with a communication to affirm the trade. The affirmation step can be completed by the institution, or the power to affirm can be delegated by it to its agent or an interested party. To affirm, the institution receives the trade confirmation communication and then compares it to data that is stored in its own records. If in agreement, the institution sends an affirmation and each party named in the confirmation typically receives the affirmed confirmation, which includes settlement instructions that agents and brokers use to settle the trade.

The process of settlement communications currently employed—NOE's, allocation instructions sent by the institution, confirmations and affirmations—ensures a high level of accuracy within the trade settlement procedure. The communications sent back and forth enable each settlement party to check records and confirm the existence of the trade and settlement details before the trade is settled.

Maintaining data accuracy and reliability in trade settlement is crucial. The system of communications—NOE's, allocation instructions, confirmations, and affirmations—establishes a level of redundancy which helps to ensure accuracy and party agreement. However, this system requires sufficient time for the parties to review and verify the incoming communications and in practice has created difficulty for the settlement parties in their meeting the T+3 trade settlement requirement. Even with the widespread use of computers, the settlement parties execute the sequence of communications using a disparate collection of telephone calls, telexes, cable and wire transmissions, faxes and hard-copy messages. This process takes considerable time to complete its function. Any new system that would offer advantages in speed over the generally used system of communications must still ensure accuracy and reliability because the cost of an incorrect or failed trade settlement is high. For any failed trade, the parties must find and rectify the reason for the failure.

Computer systems have been developed for other areas of securities trading, such as those described in U.S. Pat. Nos. 4,346,442, 4,376,978 and 4,774,663 for aspects of a cash management system for securities brokerage firm, U.S. Pat. No. 4,949,248 for aspects of a network for sharing information and programs, and U.S. Pat. Nos. 4,674,044, 4,823,265 and 5,101,353 which are directed to systems for trade execution. Computer technology has also been applied to trade settlement. However, typically all such systems maintain the prior art sequence of communications between the parties in terms of NOE's, allocation instructions, confirmations and affirmations. One system known as "Alert" and developed by Audex Systems of Wellesley, Mass. is designed to facilitate the flow of information in the communications between the institution and broker. The Alert system maintains a centralized database of institution delivery instructions (instructions for the delivery of funds or securities that the institution applies for each of its customer accounts). When the institution communicates a trade allocation instruction, the broker can access information in the central database in its preparation of the confirmation. The Alert system, however, does not change the sequence of communications between broker, institution, agents and interested parties.

U.S. Pat. No. 5,497,317, assigned to Thomson Trading Services, Inc. also follows the sequence of NOE, institution instruction, confirmation and affirmation communications. It provides a database configuration to facilitate those communications, but takes no steps to shorten the number of communications needed to settle a trade.

The Depository Trust Company ("DTC") developed a system known as the Institutional Delivery ("ID") System in the early 1970's. The ID System provides a multi-step, post-trade process that is based on the system of NOE, institution allocation instruction, confirmation and affirmation communications, but provides a central computer hub which collects information and generates the confirmation communication. With the ID System, a broker can send an NOE to an institution after executing each buy/sell order. Upon receipt of the NOE, the institution returns an allocation instruction. Upon receipt of the allocation instruction, the broker submits to the ID System trade detail information (such as issue, quantity, price and date). The ID System combines trade information with information from other sources to issue a confirmation which gives trade details, settlement information and other required data. The ID System makes that confirmation available to the institution, the broker, the agent and any other interested parties to the trade. The institution then acknowledges or affirms the confirmation by sending a message to the ID System. In a final step of the post-trade settlement process, the ID System sends an affirmed confirmation to each party. Upon the receipt of the affirmation confirmation, the trade can settle. The complete confirmation process, in which the broker transmits trade data and the ID System generates a confirmation, can take as many as five distinct communications.

DTC has recently implemented a computer process that eliminates the affirmation step in the trade confirmation process while maintaining the reliability previously achieved by the earlier NOE, allocation instruction, confirmation and affirmation communications systems. Instead of passing the broker confirmation to the institution and waiting for an institution's affirmation, the more current ID System matches trade data received from the broker for inclusion in a confirmation with institution instructions received from the institution, e.g., instructions input after NOE or at the time that the trade occurred. If the input from broker and institution agree, the system produces a "matched confirmation" which can, if the institution is also the affirming party, replace the affirmation by producing a matched affirm confirmation.

Further streamlining of the above communication steps involved in the trade settlement process would facilitate more rapid trade settlement without sacrificing accuracy. However, existing systems rely on the redundant exchange of communications to verify the information exchanged in trade settlement.

It would be an advance in the field if a new system could be developed to further reduce data redundancy while still providing sufficient data to settle the trade reliably and accurately. What is desired, therefore, is a system for improving the speed, efficiency, security and control of the current post-trade communication processing and settlement systems by more advanced matching techniques.

SUMMARY OF THE INVENTION

Accordingly, the present invention provides an enhanced matching apparatus and method to effect trade settlement in fewer steps than the prior art while maintaining the same level of reliability. The present invention matches data fields in a specially constructed NOE with data fields in a specially constructed institution instruction to generate either a "matched confirmation" or a "matched affirm confirmation." In this system, a matched confirmation or matched affirm confirmation can be automatically generated by the computer system upon a correct match. Thus, the subsequent steps of a broker or computer-generated confirmation and then affirmation are no longer needed. The present invention increases speed and lessens the risk of trade failure by insuring that the trades are settled within the mandated time periods for completion of settlement using fewer steps than existing systems. The system also decreases opportunities for computer or human errors, because the matching system replaces the back and forth communication in the confirmation and affirmation (where with every communication there may be a chance for human and computer error).

According to an exemplary embodiment of the present invention, in the first step after trade execution, the broker sends an NOE to a central computerized trade confirmation communication system. The system attempts to match the NOE against an existing institution instruction. If no match can be found, the computer system copies the NOE information to a pending match database and optionally communicates the NOE to the institution. Upon receipt of an NOE which agrees with the institution's records, the institution sends an allocation instruction to the system. The system then attempts to match specially designated data fields of the institution instruction to the data fields in the stored pending NOE. If all the information contained in the data fields are properly matched (according to a matching procedure described below), the system then creates a confirmation (such as a "matched confirmation" or a "matched affirmed confirmation") using information found in the allocation instruction and NOE and, in one exemplary embodiment, information derived from a database source comprising a multitude of tables. The system then makes this confirmation available to the institution, agent, broker and any interested parties to the trade so that the parties can effect settlement.

When the broker transmits multiple NOE's for the same trade order (because multiple trade executions are required for that trade order), the system will match an institution allocation against the final NOE for that trade order. The final NOE for the series of executed trades will contain sufficient cumulative information to allow a match to be possible.

When compared against the prior art trade confirmation communication systems (with or without matching) the present invention in the exemplary embodiment shortens the sequence of communication required by as many as one or two communications. This saves processing time and speeds the settlement process.

The present invention and its features and advantages will become more apparent from the following detailed description with reference to the accompanying drawings.

DETAILED DESCRIPTION OF THE INVENTION

A. Overview

Hardware and Software

Figure 1:
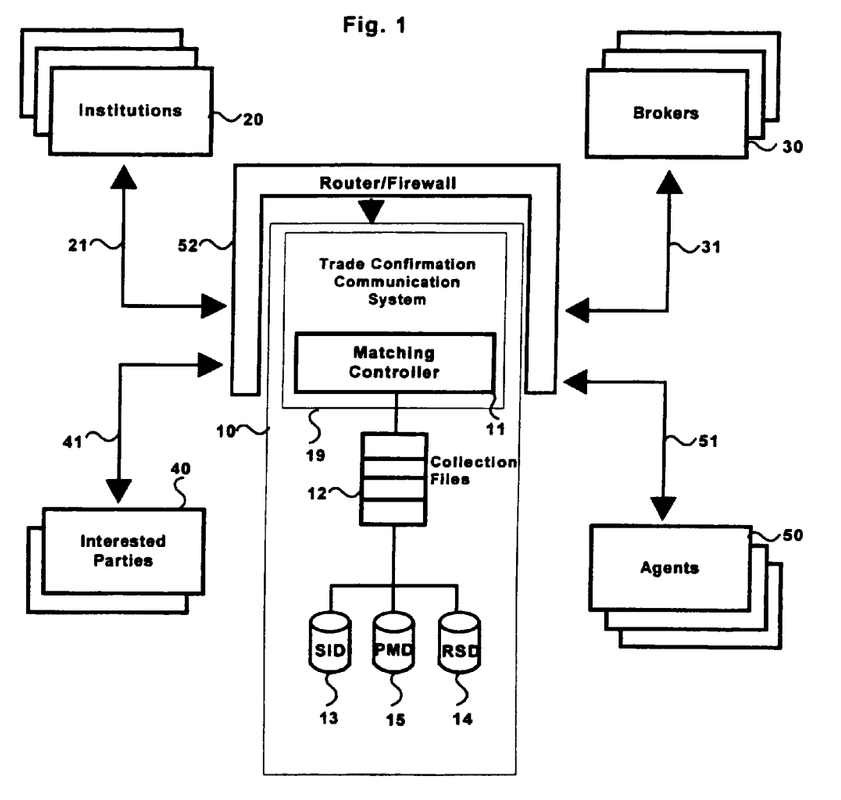
FIG. 1 is a block diagram showing an enhanced matching communication system for post-trade processing and settlement of securities trades according to an exemplary embodiment of the present invention.

FIG. 1 shows an overview of an exemplary communication system for enhanced matching used during post-trade settlement for trade confirmation. A computer 10 comprises a trade confirmation communication system 19, having a set of programmed elements that enables each of the settling parties, institution(s) 20, broker(s) 30 (here including clearing brokers), agent(s) 50 (here including clearing agents) and interested party(ies) 40 to exchange electronic communications in trade settlement. Within the trade confirmation communication system 19 (or as a separate add-on component for it) there is also a matching controller 11 that executes trade confirmation functions for matching. A plurality of collection files 12 within the computer 10 facilitates the processes of the matching controller 11. The computer 10 also comprises and provides a platform for a Pending Match Database ("PMD") 15 (which is used in the enhanced matching process described below) and additionally in the exemplary embodiment, additional database structures for generating a confirmation such as a Standing Instructions Database ("SID") 13 and a Related Storage Database ("RSD") 14 (used with SID 13) each comprising a plurality of databases. In the exemplary embodiment the trade confirmation communication system 19 allows the institutions 20, brokers 30 and agents 50 to input data into the database structures before the time of trade settlement. During trade settlement, the system derives the data from the various database tables to generate a confirmation.

As will be explained in further detail below, the computer 10 uses the elements described above to match trade communication input from the parties and create trade confirmations. In brief, the process in the exemplary embodiment is as follows.

After trade execution, a broker 30 that has made a trade on behalf of an institution 20 transmits an NOE concerning that trade to the computer 10. The NOE is stored in a collection file 12 (for verification) and then moved into the PMD 15. The computer 10 also transmits a copy of the NOE to the institution 20 (identified in the NOE). Upon receipt of the NOE, the identified institution 20 can respond by transmitting an institution allocation instruction (an "II" for Institution Instruction) that provides customer account allocation information concerning the trade. The II message is stored in the collection file 12 (for verification) and then moved to the PMD 15. The computer 10 will attempt to match the II with an NOE located in the PMD 15. The computer 10 will make the match upon a set of predetermined data fields within each NOE and II record. If the broker 30 must execute a number of trades to fulfill the institution's trade order, the broker 30 may transmit a number of NOE's for the particular trade order. In such a situation the system of the present invention will match the last NOE (containing the full cumulative information for the trade orders) to the II of the institution 20.

With the present invention, it is also possible (although it may not be the usual case) that the institution 20 will transmit an II to the computer 10 before the broker 30 transmits an NOE. Thus, in addition to storing and transmitting an NOE as described above, the computer 10 will also attempt to match an NOE at the time it is input to the II's stored in the PMD 15.

If a match is found either for a single NOE or the last of a series of NOE's (according to a matching procedure outlined below) the computer 10 generates a matched confirmation using the data found in the NOE, II and related data found in SID 13 and the RSD 14.

If the affirming party to the trade is the institution 20, the computer 10 will generate the confirmation communication as a matched affirmed confirmation. The computer 10 will make available this matched affirmed confirmation message to all parties, broker 30, institution 20, agent(s) 50 and interested party(ies) 40. If the computer 10 is operated by an entity which also operates a settlement system, the computer 10, if so authorized by the delivering party, will also execute the settlement of the trade as described below.

When instruction databases such as SID 13 and the RSD 14 are employed, the computer 10 receives information concerning institutions 20, brokers 30, agents 50 and interested parties 40 before the trade settlement process, such as before the broker 30 transmits the NOE. That information is stored in SID 13 and the RSD 14 in the present embodiment. In particular, broker 30 inputs trade information necessary for preparation of confirmations, known as broker confirmation information and the agent 50 inputs information known as agent confirmation information. In the exemplary embodiment, the computer 10 amasses the trade confirmation information through a number of relational database lookups.

The computer 10 includes one or more processors ("CPUs") coupled to random access and online storage memories. The processors execute programmed instructions, access data from the memories, manipulate the data according to the programmed instructions and perform the other processing functions. The computer 10 also comprises an operating system which facilitates the functions of the matching controller 11, the trade confirmation communication system 19 and maintenance of the databases. In an exemplary embodiment, an IBM ES 9000 mainframe is suitable as the computer 10, operating with a MVS operating system. DB2 database software is suitable for implementing and maintaining the SID 13, RSD 14 and PMD 15 databases in an exemplary embodiment. The programmed elements of the trade confirmation communication system 19 and the matching controller 11 can be effected, for example, in the COBOL II computer language. The computer 10 can execute those functions using either synchronous or asynchronous tasking.

Communications between the computer 10 and the settlement parties are effected over communication links 21, 31, 41, and 51. In FIG. 1, each one of a plurality of institutions 20 (one or more) has a link to the computer 10, such as link 21. Each one of a plurality of brokers 30 has a link to the computer 10, such as link 31. Each one of a plurality of agents 50 has a link to the computer 10, such as link 51. Each one of a plurality of interested parties 40 has a link to the computer 10, such as link 41. These communication lines can be telephone wires. However, in alternative embodiments they can also be any means of communicating electronic transmissions, including both hard-wired and wireless methods. Each institution 20, broker 30, agent 50 and interested party 40 accesses its respective communication link 21, 31, 51, and 41 by a computer terminal (not shown) at a remote institution 20, broker 30, agent 50 or interested party 40 location. The computer terminals in an exemplary embodiment are computers having a 486 Intel processor (or the equivalent or better) and operating at 66 MHz with DOS 3.3 or higher and/or a Windows operating environment, 8 Mb of RAM, 1 Meg processor memory and a 9600 or higher baud modem. A communication software package resident on each PC terminal (not shown) provides an interface for transmitting communications to the computer 10 and receiving communications from it. The communication software package, such as a package known as EZTYM and available from the Software Corporation of America, also allows the settling parties input and to access data from SID 13. The computer terminals may (but do not have to) be linked to other computer systems such as the back office computer systems of the institutions 20, brokers 30, agents 50 or interested parties 40.

Security for the computer 10 is achieved by a firewall routing system 52, such as (in an exemplary embodiment) an IBM RS 6000 firewall. The firewall routing system 52 couples the communication links 21, 31, 41 and 51 to the computer 10. In an exemplary embodiment, the communication interface between the institution 20, broker 30, agent 50 and interested party 40 computer terminals ("PC's") and the computer 10 is achieved by a 3745 communications Systems Network Architecture ("SNA") communication controller using Network Control Protocol ("NCP") software from IBM. It is to be understood that the present invention is not to be limited to either the specific computer hardware or software listed above or the specific type of computer interface and communication. Other combinations of computer hardware and communication links are equally suitable for implementing the present invention.

Figure 5:
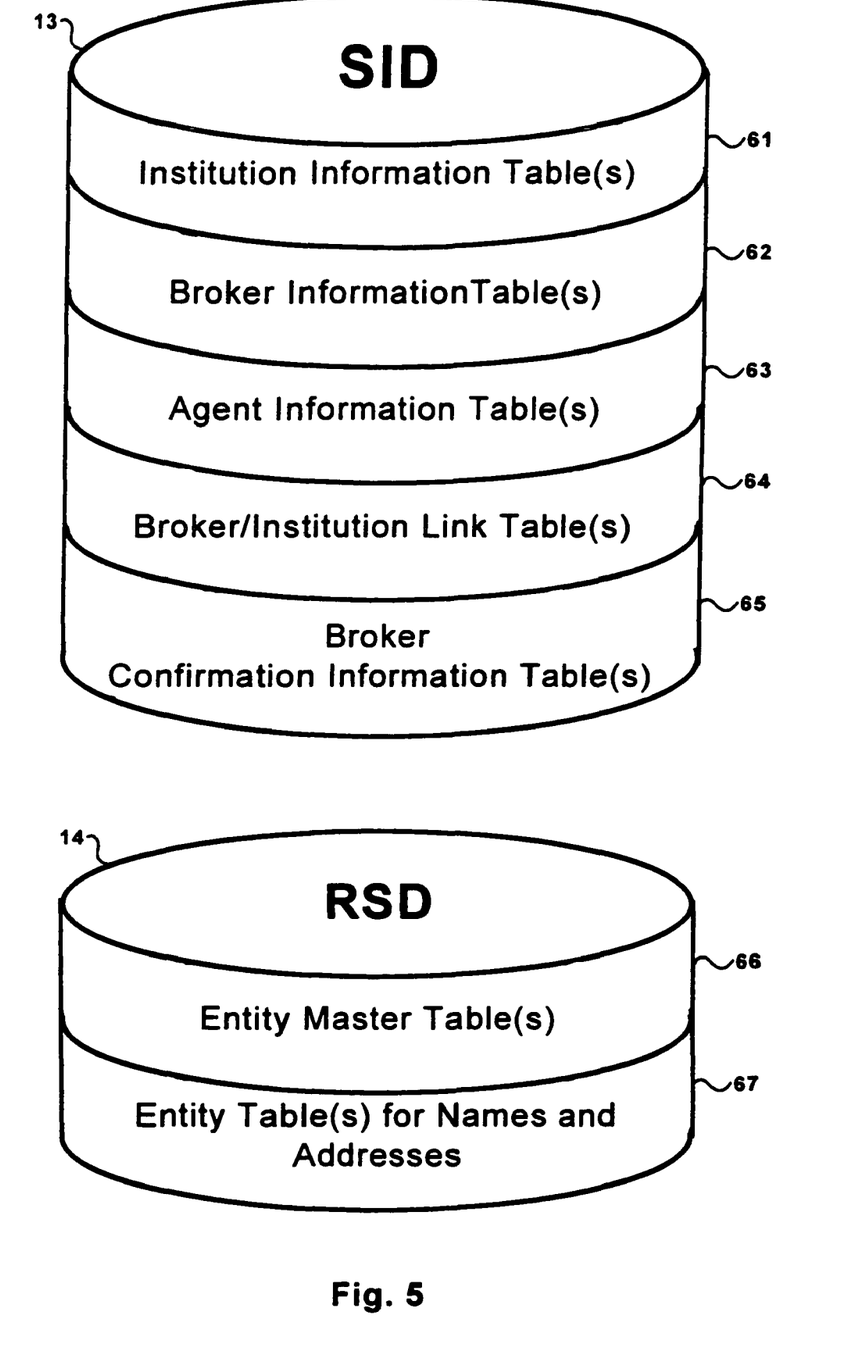
FIG. 5 depicts a database storage structure for a Standing Instructions Database (SID) and a Related Storage Database (RSD) which could be employed in one embodiment of the enhanced matching communication system for post-trade processing and settlement of securities trades.

B. Data Input for Standing Instructions Database (SID) and Related Storage Database (RSD) Tables Before trade settlement, institutions 20, brokers 30 and agents 50 can enter information into databases which can be used during trade settlement to derive information for a confirmation. In the exemplary embodiment SID 13 and the RSD 14 act as repositories of information relating to the settling parties, their customer accounts and trade settlement. Institutions 20, brokers 30 (including clearing brokers) and agents 50 (including clearing agents) can enter information. Although many different types of databases and relational database structures would be suitable, both SID 13 and the RSD 14 in the exemplary embodiment comprise a number of databases each comprising a plurality of database tables. Data (including settlement instructions) for the confirmation may be obtained from data contained in the II and NOE, and in addition derived from various database lookups using multiple queries to the different tables. These confirmation data queries may based on data in various fields in the II as well as on the results of lookups to the SID 13 databases. To input data before trade settlement, the communications software located on the computer terminals at each settlement party location provides a graphic interface and prompts to collect the relevant data such as the data described below. The communications software also contains a set of program modules to interface with the computer 10 (through the firewall) and transmit the data to it. On the computer 10, database management routines within the trade confirmation communication system 19 make the relevant updates to SID 13 and RSD 14 when communications from institutions 20, brokers 30 or agents 50 arrive. Referring to FIG. 5, exemplary database tables within SID 13 and the RSD 14 include:

Standing Instruction Database Tables:
Institution Information Table(s) 61
Broker Information Table(s) 62
Agent Information Table(s) 63
Broker/Institution Link Table(s) 64
Broker Confirmation Information Table(s) 65
Related Storage Database Tables:
Entity Master Table(s) 66
Entity Table(s) for Names and Addresses ("ETNA") 67

Each data structure is discussed below. In addition, the uses of databases and data types such as SID 13 and RSD 14 databases, as well as the functions of data input and trade settlement are also described in the following DTC publication, expressly incorporated herein by reference: *Institutional Delivery System User Manual*; which is also published as *Participant Operating Procedures—Section M: Institutional Delivery System*.

Institution Information Table(s) (61, FIG. 5): In the exemplary embodiment, institutions 20 enter information concerning both the institution itself and the accounts it maintains for itself and its customers. The tables within this data structure could include information such as: 1) institution information (e.g., processing indicators and indicators designating business arrangements of the institution 20); 2) the institution's account information; 3) the institution's and/or customer's agent information; 4) affirming party information; 5) interested party information; 6) broker lists; 7) settlement amount tolerances; and 8) matching options. The tables organize the data for example as it applies to the institution 20 or its customer accounts.

The institution 20 specifies each account with a unique identification number. For each of the institution's accounts, specific information can be entered into and later obtained through SID 13, such as: (a) the institution's internal account number for the customer's account; (b) the institution's internal account name for the customer's account (which e.g. would default to the institution's name when the account name was not input); (c) a system number for the customer's account; (d) a U.S. taxpayer identification number (a Social Security or other taxpayer identification number) for the customer; and (e) a bank identifier code ("BIC") number for the customer or account. The computer terminals at the institution's location include a PC interface that prompts the institution 20 to enter such customer account information.

In addition to customer account information, institutions 20 also enter the agent information for each customer account, such as: (a) an identification number for the agent 50; (b) the agent's internal account number assigned by the agent 50 to that customer account; and (c) the agent's internal account name for that customer account. The agent information obtained is similar to customer information described above. The PC interface at the institution location requests the agent information following the method described above for obtaining customer information. However, in addition, the PC interface also prompts the institution 20 to input certain settlement information regarding the agent 50, which can be used to derive from agent-related data tables specific settlement instructions to be used in different situations. The settlement instructions provide, for example, the appropriate clearing agent of the agent 50 when more than one exists. For example, the agent 50 might use one clearing agent for DTC eligible trades, another when the settlement location is a Federal Reserve Bank and a third for international settlements. Detailed information concerning agents 50 and their settlement procedures is contained in the Agent Information Table(s) 63 described below. In the exemplary case, settlement information can be to extracted from the agent database table(s) using a combination of information in the II and information in the Institution Information Table(s) 61. Thus agent settlement instructions may be derived through a set of database look-ups.

In addition to the customer and agent information, the institution 20 can input and store information concerning affirming parties, interested parties 40 and brokers 30. The affirming party information contains information regarding the affirming party type (e.g., institution 20, agent 50, interested party 40), and the affirming party identification number. The interested party information contains information regarding the interested party, such as identification number, interested party internal account number and interested party internal account name. The broker lists contain information regarding the identification of brokers 30 that act as executing brokers on behalf of the institution 20 or a specific customer.

To select the matching option, the institution 20 can set a matching indicator (y/n) which shows whether the institution 20 authorized a match for a particular account. If the institution 20 has elected to match an II to a broker NOE, the institution 20 can set tolerances for a settlement amount so that an exact match on this field is not required to generate a matched or matched affirmed confirmation. To set a tolerance in the exemplary embodiment, the following information will be entered for each currency: (a) currency code; and (b) either a tolerance value for the total settlement amount of the trade order, as expressed in an absolute amount of an appropriate currency (e.g., a difference $50.00 per trade in U.S. dollars between an II and an NOE), or a tolerance value as it relates to total settlement amount, expressed as a percentage (e.g., $10.00 per $100,000 of total settlement in U.S. dollars). This information can be entered for all customer accounts of the institution 20 or individually at the customer account level. The institution 20 may also elect not to match for specific settlement locations and for specific security types within those locations (e.g., match everywhere except for trades settling in the U.K.; match every type of security except for equity trades within the location). Thus, the matching options within the Institution Information Table(s) 61 provide indicators to set such matching tolerances and preferences.

Broker Information Table(s) (62, FIG. 5): Brokers 30 (and clearing brokers) enter information to specify information used by the broker and clearing broker for trade settlement of the broker's accounts. The tables in this data structure organize the data for example as it applies to the broker, the clearing broker and individual customer accounts. The information designates for example which clearing brokers, if any, should be used for settlement according to location (depository or country) and security type. Brokers 30 enter information for each settlement scenario, such as: 1) settlement location (codes specifying countries or depositories to be used for trade settlement); 2) security types (codes identifying the security being traded, e.g., equities, corporates or eurobonds); 3) clearing broker number (an identification number of the clearing broker used to settle); and 4) clearing broker internal account number (broker's account number at the specified clearing broker).

The trade confirmation communication system 19 also provides that, at the customer account level, a broker 30 can link its internal account number for a specific account to a corresponding institution internal account number (found within the account records of the Institution Information Table(s) 61). This allows for the extraction from SID 13 of information previously entered by the institution 20 in SID 13 in lieu of requiring that the broker 30 enter all such customer information on trade input. The computer 10 stores the link information in the Broker/Institution Link Table(s) 64. To permit NOE's to be matched to II's, the inputting broker 30 sets a match indicator (y/n) for the specific customer account indicating that it agrees to match with the institution's corresponding customer account. The Broker/Institution Link Table(s) 64 allows the broker 30 to see whether the institution 20 has selected a matching option for that account.

Agent Information Table(s) (63 FIG. 5): Agents 50 (and clearing agents) enter information to specify settlement instructions for trade settlement. An agent 50 will specify settlement instructions that it will use when settling a trade of a particular type of security at a particular location. In some situations the agent 50 will use a clearing agent for the settlement of a security at that location. In that circumstance, the agent's settlement instruction will identify the clearing agent and provide reference to further settlement instructions specified by the clearing agent (such as the name and account number of a subcustodian which will act to exchange securities and funds to settle the trade). Agent Information Table(s) 63 will contain agent account numbers related to the clearing agent and subcustodian. In addition to other data, the settlement information which is stored in the Agent Information Table(s) 63 can include: 1) an agent identification number; 2) security type indicator; 3) settlement location indicator; 4) a clearing agent identifier; 5) a clearing agent's internal account number for the agent; 6) a subcustodian identifier; and 7) a subcustodian's internal account number for the clearing agent.

Broker/Institution Link Table(s) (64, FIG. 5): This table contains a set of cross-references between broker internal account numbers and institution internal account numbers for specific accounts. The broker 30 generates this link as set forth above.

Broker Confirmation Information Table(s) (65, FIG. 5): Brokers 30 enter information required by SEC Rule 10b-10 or otherwise required to be included for each trade. Such information includes: 1) broker/dealer commissions; 2) federal taxes; 3) state taxes; 4) local taxes; 5) shipping/registration fees; and 6) customer disclosure information.

The Related Storage Database Tables (66 and 67 FIG. 5): In addition to the SID 13 tables above, databases within RSD 14 also supply settlement background information. The identifiers in SID 13 create links to information in two tables in RSD 14: the Entity Master Table(s) 66 and the Entity Table(s) for Names and Addresses ("ETNA") 67. The Entity Master Table(s) 66 contains a list of unique identifiers for each entity (e.g., institution 20, broker 30 and agent 50) using the system. These names are input by, for example, an administrator or service department of the trade confirmation communication system 19 when an institution 20, broker 30 or agent 50 submits an application to use the system. The information stored in these tables cannot be later modified by the end users. An identification number for an institution 20, broker 30 or agent 50 input to SID 13 generates e.g. the corresponding name, address and background information from the ETNA 67.

Updating SID (Adding, Changing or Deleting Information on the Database): Within SID 13, institutions 20, brokers 30 and agents 50 each have the ability to enter changes with an effective date that specifies when the addition, change or deletion should be put into effect. In an exemplary embodiment, for example, the brokers 30 affiliated with a specific account on the Institution Information Table(s) 61 as described above would be notified when an institution 20 inputs a change to the account information stored on that database. In an exemplary embodiment the trade confirmation communication system 19 uses a specified "effective date" to determine when a change is implemented. In the exemplary embodiment, all parties responsible for entering information in SID 13 have the ability to enter a SID change with an effective date specifying when the addition, change or deletion should be put into effect. Effective date changes fall into two categories: trade date-related changes and settlement date-related changes. Both dates are independent of notification to a broker 30 or other party, which may occur on the day of the update.

C. Trade Settlement Through Matching and the Pending Match Database (PMD)

The information input into the SID 13 and RSD 14 databases can be used with an NOE and II to generate a confirmation. However, to facilitate matches between an NOE and II, the present invention provides the PMD 15 database in addition to the SID 13 and RSD 14 databases.

Figure 6:
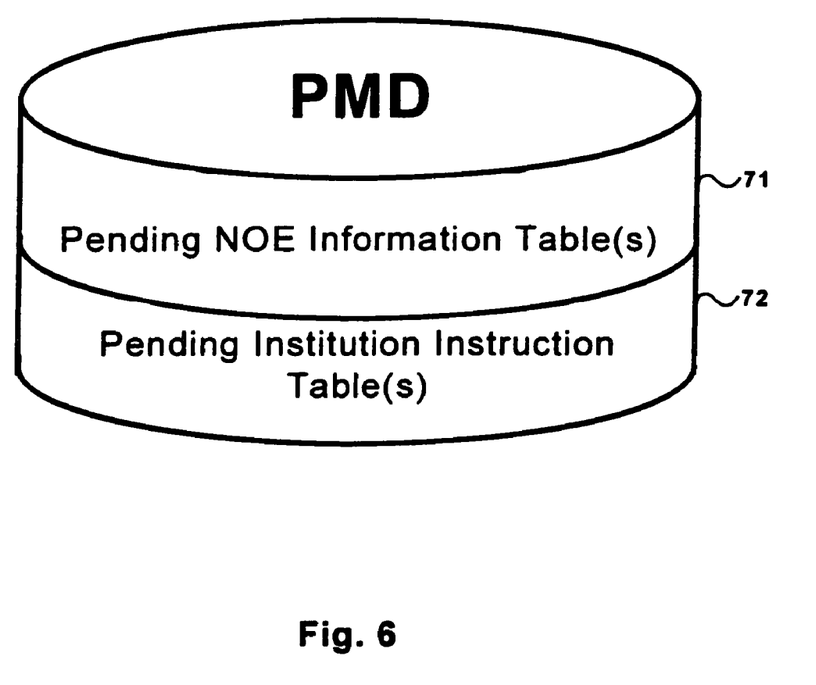
FIG. 6 depicts an exemplary relational database storage structure for a Pending Match Database (PMD) of the enhanced matching communication system for post-trade processing and settlement of securities trades according to an exemplary embodiment of the present invention.

The Pending Match Database (PMD) (FIG. 6): The PMD 15 contains information relating to the securities trade itself and is used to match NOE's and II's. For storage of such information, the PMD 15 has a relational database storage structure made up of database tables. Referring to FIG. 6, the PMD 15 database tables include, but are not limited to, the following:

Pending NOE Information Table(s) 71; and

Pending Institution Instruction Table(s) 72.

D. NOE and II Matching

In trade settlement, before securities are exchanged for funds, the parties must first confirm the trade and agree to the details of its settlement. The enhanced matching system of the present invention matches data fields between the II and NOE, and then generates a confirmation using the information found in the II and NOE and additional information from the standing instructions in the SID 13 and RSD 14 databases.

1. Broker NOE Communications

Figure 2:
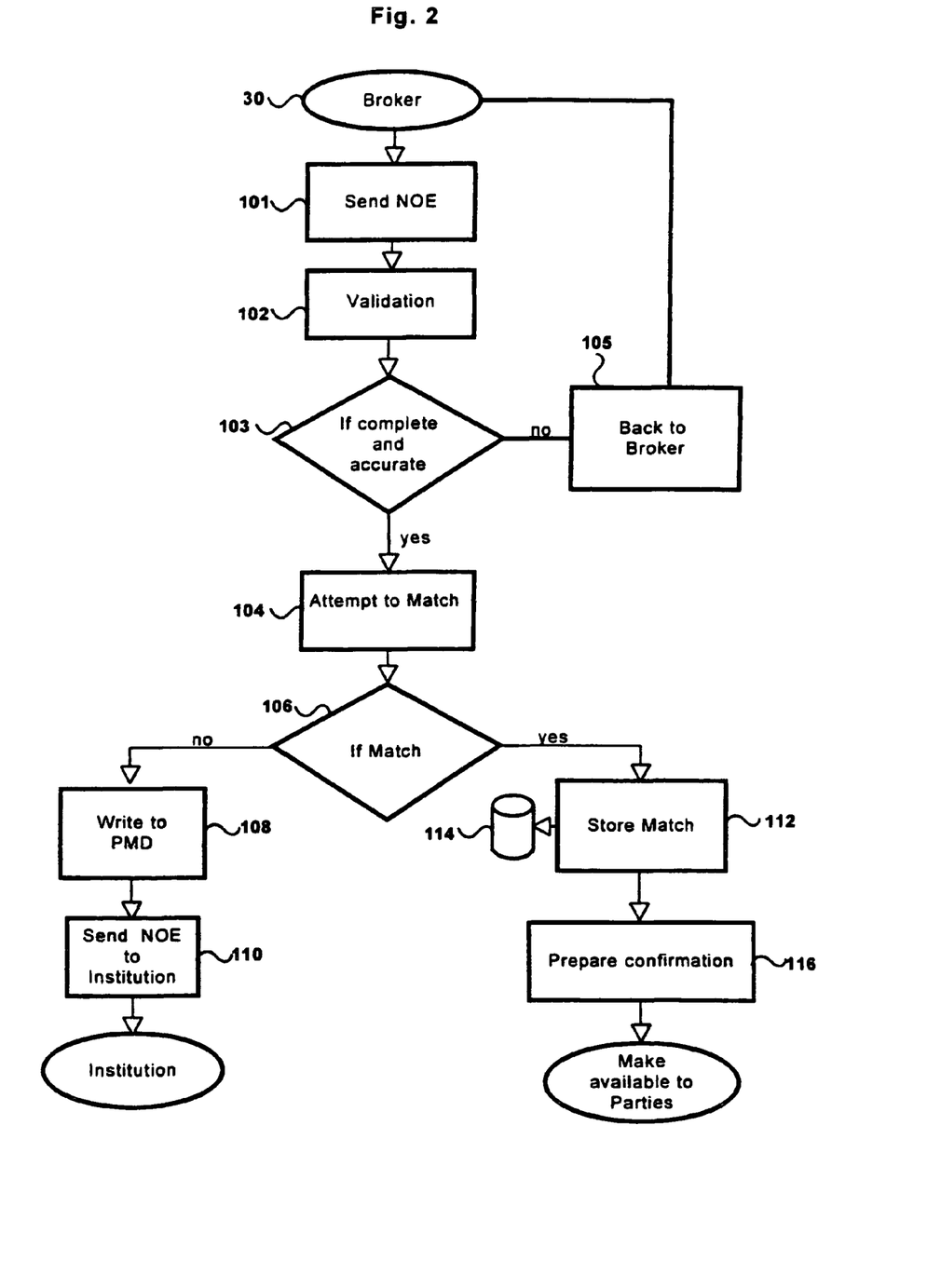
FIG. 2 is a flowchart showing an exemplary process flow of an NOE matching process in an enhanced matching communication system for post-trade processing and settlement of securities trades.

FIG. 2 depicts an exemplary process flow for the steps of the broker communication and system execution in the matching process. In step 101 broker 30 generates an NOE after a securities trade has been executed (to fulfill either part or all of the trade order) and sends the NOE to the computer 10. (Referring to FIG. 1, broker 30 transmits the NOE to the computer 10 along communication link 31 and the trade confirmation communication system 19 receives the NOE). To generate the NOE in the exemplary embodiment, the communications software on the computer terminal at the broker 30 location enables the broker 30 to provide information on the executed trade: e.g., broker information, trade details and identification. This information can be used in conjunction with the data within the Broker Information Table(s) 62 and the Broker Confirmation Information Table(s) 65 to generate confirmation information. In an exemplary embodiment, the NOE contains information in its data fields such as the following:

- A Transaction Type to identify the communication as either an NOE, II or other communication;
- A Unique Reference Identifier to identify the NOE;
- A Broker/Dealer Identification Number to identify the broker 30 for this the securities trade;
- A Broker Internal Account Number to identify the broker's customer (for individual orders, not to be used on block orders).
- An Institution Identification Number to identify the institution 20 for this securities trade;
- A Security Type to identify the type of security traded (e.g. equity, fixed income);
- A Security Identifier Number for identification of the security (e.g., a CUSIP number);
- A Ticker Symbol;
- A Buy/Sell Code for determination of whether the institution 20 is buying or selling the securities;
- A Cumulative Shares/Face Value Amount for determining the number of shares or the face value of the securities which have been traded up to that moment in fulfillment of the trade order (e.g. 10,000 shares, $10,000 in face value of debt securities);
- An Average Price Per Share/Face Value or other unit at which the securities were traded to provide an average price per share/value for the securities which have been traded to up to that moment in fulfillment of the trade order;
- An Execution Shares/Face Value Amount for determining the number of shares or the face value of the securities which have been traded for the particular trade execution documented by the NOE (e.g. 1,000 shares, $1,000 in face value of debt securities);
- An Execution Price Per Share/Face Value or other unit at which the securities were traded to provide an average price per share/value for the securities which have been traded in the particular trade execution documented by the NOE;

A Total Settlement Amount for the Trade to specify the amount of the trade order (including all costs);

A Currency Code;

A Trade Date to indicate the date on which the trade was executed;

A Settlement Date to indicate the date by which the trade is to be settled;

The Settlement Type to identify whether the trade is to settle e.g. on a "regular basis" or on a "when issued basis";

A Match Indicator Override to indicate that this particular trade will not be matched and matching should be canceled for this trade when a broker 30 has selected matching for the account;

The present invention permits the broker 30 to designate matching by account and then override matching on a trade-by-trade basis. When inputting data into the Broker Information Table(s) 62 within SID 13 the broker 30 can input a Match Indicator for a particular customer account. In the match process, the Match Indicator found for the account within the Broker Information Table(s) 62 will control unless the specific Match Indicator Override within the NOE is set to override it. The fields specified above are exemplary and the NOE can be created with additional fields or fewer fields.

In step 101 the broker 30 transmits the NOE to computer 10 (using the computer terminal (referring to FIG. 1 the broker 30 transmits the NOE to computer 10 along communication link 31 and the NOE is received by the trade confirmation communication system 19). A router (within 19) delivers the NOE to the collection files 12.

In step 102 of FIG. 2, the matching controller 11 accesses the NOE in the collection files 12 to examine and validate the data contained within. The matching controller 11 first identifies the communication to be an NOE (as opposed to an II or other communication by e.g. checking the transaction type field) and then checks the information within its data fields for completeness and accuracy of data type. If in step 103 the matching controller 11 determines that the NOE is not complete or is not verifiable, it will return the message to the broker 30 with an error code attached. If in step 103 the communication is verifiable, the matching controller 11 proceeds to step 104 to try to match the NOE with an II that may have been previously stored in PMD 15. In step 104 the matching controller 11 will first determine whether the NOE is eligible for matching by locating the match indicator for the account in both the Broker Information Table(s) 62 and the Institution Information Table(s) 61 and checking the Match Indicator Override on the NOE. If the NOE is eligible for matching, the matching controller 11 will compare it to II records ready for matching in the pending institution instruction table(s) 72 within the PMD 15.

In step 106 if the new NOE does not match any previously transmitted II's, the matching controller 11 will copy the contents of the NOE to the PMD 15 (in step 108) and then transmit the NOE (in step 110) to the institution 20 (using e.g. a router of the trade confirmation communication system 19 and communication link 21 (of FIG. 1)). If there is a match (such as if the NOE is the last of a series of NOE's and completes the trade order allocated in the corresponding II) the matching controller 11 in an exemplary embodiment proceeds in step 112 to write an indication of the match to a match file 114. (The matching procedure is described in further detail below) then creates in step 116 a confirmation to be made available to the settlement parties. (The preparation and dissemination of the confirmation is also described in further detail below.)

2. Institution II Communications

Figure 3:
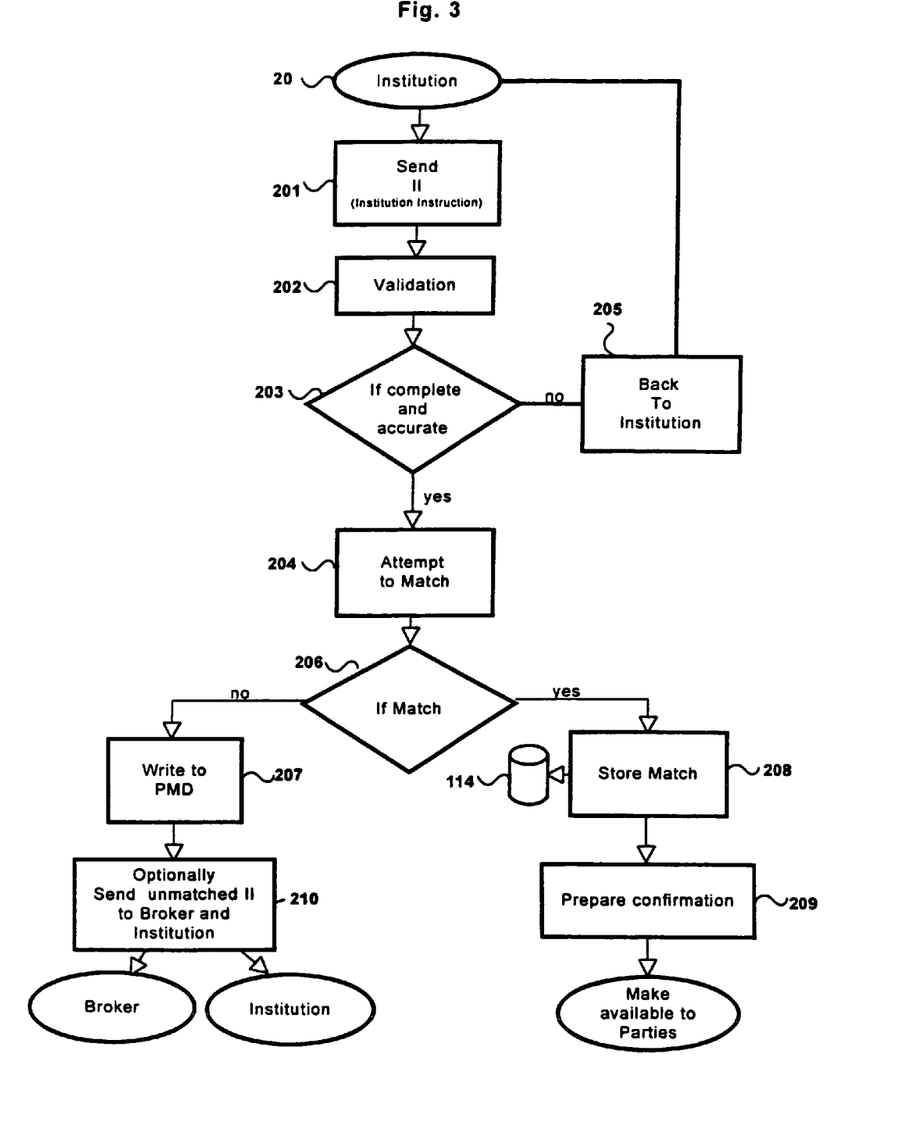
FIG. 3 is a flowchart showing an exemplary process flow of an institution instruction matching process in an enhanced matching communication system for post-trade processing and settlement of securities trades.

FIG. 3 depicts an exemplary process flow of steps when an institution 20 sends an II. In step 201 an institution 20 transmits the II to the computer 10, using the communications software on the computer terminal at the institution location. (Referring to FIG. 1, the institution 20 transmits the II to the computer 10 along communication link 21 and the trade confirmation communication system 19 receives the II). The II contains account allocation information that will permit a block trade to be allocated among the institution's customer accounts. The II comprises records containing data that is common to all of the accounts involved and also allocation and other data that is specific to each of the involved accounts. In addition to other information, the II records include:

Common Data Record Fields Such as:

A Transaction Type to identify the communication as either an NOE, II or other communication;

A Unique Reference Identifier to identify the II;

A Broker/Dealer Identification Number to identify the broker 30 for the securities trade;

An Institution Identification Number to identify the institution 20 for this securities trade;

The Unique NOE Reference Identifier to reference one NOE sent by broker 30 for the securities trade when one NOE can be used to provide information on the entire trade order and can be matched to the II;

A Block Reference Number to provide the institution's internal reference number for the particular trade;

A Security Type to identify the type of security traded (e.g. equity, fixed income);

A Security Identifier Number for identification of the security (e.g., a CUSIP number);

A Ticker Symbol;

A Buy/Sell Code for determination of whether the institution 20 is buying or selling the securities;

A Cumulative Shares/Face Value Amount for determining the number of shares or the face value of the securities in the total trade order;

An Average Price Per Share/Face Value or other unit at which the securities were traded to provide an average price per share/value for the total trade order over all of the executions required to fill an order;

A Total Settlement Amount for the Trade to specify the amount of the trade order (including all costs);

A Currency Code;

A Trade Date to indicate the date on which the trade was executed;

A Settlement Date to indicate the date by which the trade is to be settled;

The Settlement Type to identify whether the trade is to settle, e.g., on a "regular basis" or on a "when issued basis";

A Match Indicator Override to indicate that this particular trade will not be matched even though the institution 20 has selected matching for the account;

Matching Tolerance Override to re-set matching tolerances on a trade-by trade basis;

and Specific Allocation Record Fields such as:

A System Control Number, to provide a unique control number for each allocation;

The Institution Identification Number (same as above);

The Block Reference Number (same as above);

An Institution Internal Account Number (for the customer account);

A Shares Allocated/Face Value Allocated;

A Commission Type Indicator;

A Commission Fee Amount;

An SEC Fees and Shipping Amount;

Amount(s) for Taxes (country, local, etc.);

An Amount for other charges;

A Principal Amount of the Trade;

A Net Amount of the Trade (The Principal Amount plus or minus fees based on a buy/sell formula);

An Interest Amount (for calculating interest on debt securities);

The Settlement Location (e.g., DTC or a Federal Reserve. Bank);

An Agent Identification Number;

An Agent Internal Account Number; and

A Split/Currency Settlement Indicator to identify when security and funds settle in different locations;

The present invention permits the institution 20 to designate matching (and matching tolerances) by account and override that designation (and re-set tolerances) on a trade-by trade basis. When inputting data into the Institution Information Table(s) 61 within SID 13, the institution 20 can input a Match Indicator (and Tolerances) for a particular account or customer. In the matching process those match indicators would control unless the specific Match Indicator Override or Match Tolerances Override is set within the II.

The fields specified above are exemplary and the II can be created with additional fields and fewer fields. For example, in the exemplary embodiment the institution 20 can omit the Agent Identification number and the Agent Internal Account number as they can be derived from a table within SID.

The communications software located on the computer terminal at the institution 20 transmits the II to the computer 10. Referring to FIG. 1, institution 20 transmits the II to the computer 10 along communications link 21 and the trade confirmation communication system 19 receives the II. A router (within 19) delivers such communication to the collection files 12.

In step 202 of FIG. 3, the matching controller 11 accesses the collection file 12 to examine the new II. The matching controller 11 first identifies the communication to be an II (as opposed to an NOE or other communication) and then checks the information within the data fields for completeness and accuracy of data type. If, in step 203, the matching controller 11 determines that the II is not complete or is not verifiable, it will proceed to step 205 and return the message to the institution 20 with an error code attached.

If the communication is verifiable in step 203, the matching controller 11 will proceed to step 204 and attempt to match the II with an NOE stored in the PMD 15. In Step 204 the matching controller 11 will first check the match indicators for the institution's account to determine if the II is eligible for matching. The matching controller 11 will check the Match Indicator for the account within both the Institution Information Table(s) 61 and Broker Information Table(s) 62 to see if matching has been selected and also check the Match Indicator Override on the II to determine if the preference for matching has been overridden. If the II is eligible for matching, the matching controller 11 will attempt to match the II with an NOE in the Pending NOE Information Table(s) 71 within the PMD 15. (The matching process is described below.)

If in step 206, the matching controller 11 finds no match for the II in the Pending NOE Information Table(s) 71, the controller then proceeds to step 207 and copies the II onto a location in the Pending Institution Instruction Table(s) 72 within the PMD 15, waiting for a match to occur upon receipt of a new NOE. The matching controller 11 may then in step 210 send a copy of the II to the broker 30. If in step 206, the matching controller 11 does match an II with an NOE (or a final NOE in the case of a series of NOE's resulting from multiple executions filling one order), the controller then proceeds to step 208 to store an indicator of the match on the match file 114, and then in step 209 generates a matched confirmation communication and makes the confirmation available to the settling parties as described below.

E. Matching

In the exemplary embodiment of the present invention, the matching controller 11 matches on the basis of a one for one match between fields within an II and an NOE. First, the present invention attempts to match the number in the NOE's Unique NOE Reference Identifier field with the number found in the corresponding field of the II. As stated above, the II to be matched can contain a reference to a specific NOE in its Unique NOE Reference Identifier field (when the field has not been set to "MULTIPLE" as described above). In step 106 FIGS. 2 and 206 FIG. 3, the matching controller 11 will attempt to locate within the Pending NOE Information Table(s) 71 the NOE which corresponds to the Unique NOE Reference Identifier within the II. If that NOE can be found, the matching controller 11 will find a match and then validate the match by confirming that certain other fields in the NOE and II (e.g., the fields listed in the following paragraph) also match.

Even if the system can find no match based on the Unique NOE Reference Identifier, the matching controller 11 will continue to attempt to match based on a one for one match of the data within other fields common to both the NOE and II such as by:

The Broker/Dealer Identification Number to identify the broker 30;

The Institution Identification Number to identify the institution 20;

The Security Identifier Number for identification of the security (e.g., a CUSIP number);

The Buy/Sell Code for determination of whether the broker 30 is delivering or receiving the securities;

An Cumulative Shares/Face Value Amount for determining for determining the number of shares or the face value of the securities in the total trade order (e.g. 10,000 shares, $10,000 in face value of debt securities);

The Total Settlement Amount;

The Trade Date; and

The Settlement Date.

Additionally, other fields could be specified for the match. For instance, an NOE could be constructed to contain additional institution and agent data fields and these fields could be compared by the matching controller 11 to corresponding fields in an II to determine if a match exists. Matching those additional fields in the NOE and II could provide additional reliability to the match and could also be used to identify particular trades, such as a single (non-allocated) trade. The additional matching fields could also be required, if, for example, the broker 30 did not link its internal account number to the institution's internal account number in the Broker/Institution Link Table(s) 64 within SID 13.

The matching procedure described requires that information entered by both the broker 30 and the institution 20 "match" field by field and item by item. However, it is possible to designate tolerances within the total settlement amount. For example, if a tolerance parameter of $5.00 is set by the institution on the settlement amount, and if the settlement amount listed on the NOE and II differ by $5.00 or less, the system still could consider the trade a "match" if all other fields matched. In an exemplary embodiment, the institution 20 has the ability to enter tolerance parameters for settlement amount in the Institution Information Table(s) 61 within SID 13, by settlement currency in two ways. First, the institution 20 may enter an absolute tolerance amount, specifying that the settlement amount submitted by the broker 30 in a particular currency may not vary by more than a pre-determined amount per trade, regardless of the total settlement amount. For example, using U.S. dollars, the institution 20 might enter a $50.00 absolute tolerance amount, indicating that the Total Settlement Amount field within the NOE of the broker 30 must never deviate from the Total Settlement Amount field within the II submitted by the institution 20 by more than $50.00. Second, the institution 20 may express the tolerance amount for a given currency as it relates to the total settlement amount for trades in that currency. For example, the institution 20 might enter a tolerance parameter indicating that, for each $100,000 of the total settlement amount, the Total Settlement Amount submitted by the broker 30 must not deviate from the Total Settlement Amount submitted by the institution 20 by more than $10.00. The absence of a tolerance parameter for a specific currency would require an exact match on the settlement amount.

As indicated above the present invention also allows for matching where multiple trades are required to fill an institution's trade order. In this case, a series of NOE's will be generated and received, where the final NOE in the series for the trade order will indicate the total amount of shares purchased for this trade order and the average price of those shares (across the multiple executions) in its Cumulative Shares/Face Value and Average Price Per Share/Value fields, respectively. The matching controller 11 may determine a match for the final NOE in such a series by, for example, determining that the Cumulative Shares face value field in the final NOE matches the corresponding field in the II. When such a final NOE is found, and the matching controller 11 finds a corresponding II, a confirmation will be generated as described below. For the non-final NOE's in such a series, the matching controller 11 may (e.g. by matching all fields indicated above except for the Cumulative Shares/Face Value, Average Price Per Share Value, and Total Settlement Amount fields) determine that the NOE is related to an II, but is not the final NOE in the series. A confirmation will not be generated for such a partial NOE match.

The matching criteria presented above are exemplary. It is understood that there are other, different fields by which a match could be obtained.

In step 106 (of FIG. 2 referenced above) and in step 206 (of FIG. 3 referenced above), the computer 10 matches the information data fields to determine if the II and the NOE refer to the same securities trade based on one or more of their fields as described above and generates a confirmation as described below. The matching system of the present invention is able to generate a confirmation after only one post-trade entry each by the institution 20 and the broker 30 rather than the prior art's multiple exchange. The reduction in communications ensures greater speed and greater accuracy.

F. Confirmation Generation Based on the Match

Figure 4:
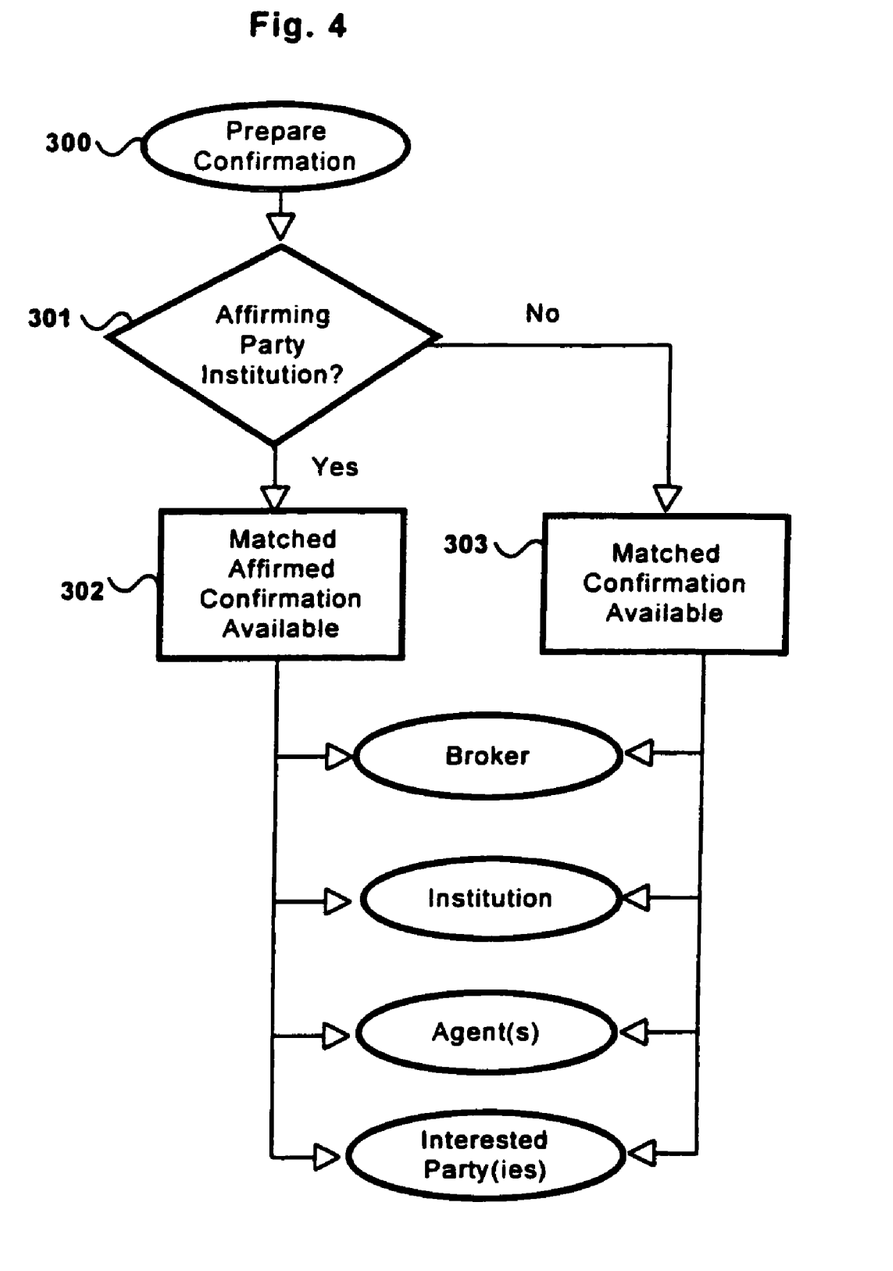
FIG. 4 is a flowchart showing an exemplary process flow for generating a confirmation in an enhanced matching communication system for post-trade processing and settlement of securities trades.

If a matching criteria above yields a match between an NOE and II, such as in step 206 of FIG. 3, the matching controller 11 can in step 209 generate a confirmation based on information from the II (and/or the NOE) and from data contained in SID 13 and RSD 14. This confirmation will contain details on the trade and instructions for settlement. The matching controller 11 also adds client account information stored within the database tables. The extraction of information from SID 13 will start with lookups based on several different fields both in the common and specific areas of the II (and/or similar fields in the NOE). Multiple databases within SID 13 may have to be queried, and information derived from these first SID database lookups may be combined with information contained with various fields to perform further SID database lookups. The confirmation may consist of:

Institution Identification Number;
Institution Name (e.g. from RSD 14);
Broker/Dealer Identification Number;
Broker Name (e.g. from RSD 14);
Broker Internal Account Number;
Clearing Broker Number;
Clearing Broker Name (e.g. from RSD 14);
Trade Date;
Agent Identification Number;
Agent Name (e.g. from RSD 14);
Agent Internal Account Number;
A Clearing Agent Identifier for identification of the agent used to settle;
A Clearing Agent Name (e.g. from RSD 14);
A Clearing Agent Internal Account Number to identify the agent's account;
A Subcustodian Identifier (if necessary) to identify the subcustodian, branch number or depository;
A Subcustodian Internal Account Number (if necessary) to identify the subcustodian's account number for the clearing agent;
A Subcustodian Account Name (if necessary) to identify the subcustodian's account name;
A Split Currency Settlement Indicator to indicate whether cash settlement for the trade is taking place in a currency other than the currency of the country in which security settlement is taking place, and that the cash and security settle in different locations;
Trade Date;
Settlement Date;
Buy/Sell Code;
Settlement Location;
Security Identifier Number (e.g. a CUSIP number);
Security Description (e.g. from RSD 14);
Security Type;
Cumulative Shares/Face Value Amounts;
Average Price Per ShareNalue;
Total Settlement Amount;
SEC Fees and Shipping Amounts;
An Interest Amount (for calculating interest on debt securities);
Amounts for Taxes (county, local, etc.);
A Commission Fee Amount;
Other Charges;
Principal Amount of the Trade Value;
Interested Party Information;
Settlement Type; and FIG. 4 depicts an exemplary process flow for the steps of generating a confirmation comprising II, NOE and SID-derived information. In step 300 the matching controller 11 prepares the confirmation. In step 302 or 303, the confirmation will be made available by the computer 10 to the broker 30, institution 20, agent(s) 50, and interested parties 40. (Referring to FIG. 1, the matching controller 11 makes this communication available via communication links 21, 31, 41, and 51.) In step 301, the matching controller 11 determines the type of confirmation to be sent. In the exemplary embodiment there are two types of confirmations available, depending on which party to the transaction is designated as the "affirming"

party. The institution 20 stores information concerning the "affirming" party in the Institution Information Table(s) 61, within SID 13 (see FIG. 5). If the institution 20 is the designated affirming party (which has also agreed to the matching process), in step 302 of FIG. 4, the confirmation is sent as a "Matched Affirmed Confirmation". If the affirming party is a party other than the institution 20, such as the interested party 40, in step 303 the confirmation is sent as a "Matched Confirmation" requiring subsequent affirmation. Settlement, the actual exchange of the traded securities and payment, can be effected through electronic or other methods. The broker 30 and agent 50 upon receipt of an affirmed confirmation (e.g. transmitted to the terminal at the agent's location) can effect an exchange of funds and securities according to the delivery instructions set forth in the confirmation.

In the exemplary embodiment, the matching controller 11 identifies unmatched items interactively where it has found (e.g., after a specified time) that no match exists between the NOE and II. For such cases, the matching controller 11 can also generate an "unmatched NOE or II" communication which will be made available to the respective broker 30 or institution 20. During and/or at the end of each processing day, the system also generates an "unmatched" report, which is cumulative, and lists all NOE and II's which were not matched during the day (or during prior days).

The invention continues as described above. The above described embodiment of the invention is meant to be representative only, as certain changes may be made therein without departing from the invention's clear teachings.

What is claimed is:

1. A system for settlement of a securities trade by communicating the details of the trade among a broker, institution, agent and interested parties comprising:
   a. a computer system which enables the broker and institution to send and receive communications and make communications available to the agent and interested parties;
   b. a standing instructions database containing sets of instructions for trade settlement input by the institution, the broker and the agent prior to the securities trade;
   c. a processing computer within the computer system, which is coupled to the standing instruction database and which is configured to:
      i. receive a series of communications from the broker containing notice of order execution information, the series including a last broker communication;
      ii. receive a communication from the institution containing institution allocation instruction information (an institution communication);
      iii. match, at the processing computer, the institution communication with the last broker communication based on information contained in both communications;
      iv. if there is a match, generate a confirmation for the trade based on information contained in the last broker communication, information contained in the institution communication and information stored in the standing instructions database; and
      v. make available, from the processing computer, the confirmation as a communication to the institution, broker, agent and interested parties for the exchange of money and securities to settle the trade.

2. The system of claim 1 where the institution communication and each communication in the series of broker communications each contain the data fields of:
   a. an institution identification number;
   b. a broker identification number;
   c. a security identification number;
   d. a buy/sell code;
   e. a number of shares or face value;
   f. a settlement amount;
   g. a trade date; and
   h. a settlement date;

and the processing computer matches at least the last broker communication with the institution communication based on those fields.

* * * * *